United States Patent [19]

Oyoshi et al.

[11] Patent Number: 4,986,841
[45] Date of Patent: Jan. 22, 1991

[54] METHOD OF PREPARING AN ALKALI METAL DIFFUSION PREVENTIVE LAYER

[75] Inventors: Keiji Oyoshi; Takashi Tagami; Shuhei Tanaka, all of Tsukuba, Japan

[73] Assignee: Nippon Sheet Glass Co., Ltd., Japan

[21] Appl. No.: 510,843

[22] Filed: Apr. 18, 1990

[51] Int. Cl.$^5$ ............................................. C03C 17/23
[52] U.S. Cl. .............................. 65/30.13; 204/157.45; 204/157.51; 427/164
[58] Field of Search ............... 65/3.14, 30.13; 204/157.45, 157.51; 427/164

[56] References Cited

U.S. PATENT DOCUMENTS 3,647,406 3/1972 Fisher .................................. 65/30.13
4,284,663 8/1981 Carruthers et al. ........... 65/30.13 X
4,371,587 2/1983 Peters .......................... 204/157.45 X
4,828,817 5/1989 Outlaw ....................... 204/157.45 X Primary Examiner—Robert L. Lindsay
Attorney, Agent, or Firm—Hill, Van Santen, Steadman & Simpson

[57] ABSTRACT

The present invention concerns a method of preparing an alkali metal diffusion-preventive layer by applying one of three specific methods in a method of forming an alkali metal diffusion-preventive layer containing phosphorus at the inside of the substrate containing silicon by ion implantation of phosphorus, thereby enabling to prepare an alkali metal diffusion-preventive layer having higher alkali metal diffusion-preventive performance than that of the alkali metal diffusion-preventive layer prepared by the conventional method.

4 Claims, No Drawings

METHOD OF PREPARING AN ALKALI METAL DIFFUSION PREVENTIVE LAYER

BACKGROUND OF THE INVENTION

1. Field of the Invention

The present invention concerns a method of preparing an alkali metal diffusion-preventive layer comprising a silicate glass layer at the inside of a substrate such as a Si substrate and silicate glass substrate by using an ion implantation method and, more in particular, it relates to a method of preparing a phosphor silicate glass layer having a performance for preventing high alkali metal diffusion.

2. Description of the Prior Art

Inorganic glass with improved surface property by implantation of ionized phosphorus from the surface has been known in, for example, Japanese Patent Laid-Open Sho No. 56-84344 and Sho No. 56-116034. Further, as a method of manufacturing glass plates for producing semiconductor device, there has been known a method of ion implantaion of phosphorus to the surface of a glass plate made of an alkali metal containing silicate glass, applying heat treatment, further implantation of nitrogen ions and then applying heat treatment again by, for example, Japanese Patent Laid-Open Sho No. 63-222046.

The method of ion implantation of phosphorus to the surface of the glass plate and applying heat treatment as described above has a merit of forming an apparent phosphor silicate glass layer at the inside of the glass plate thereby enabling to improve the surface property of the glass plate, but the effect of preventing the diffusion of alkali metal to the surface of the glass substrate (so-called gettering effect of the alkali metal) can not be attained as expected and there has been a problem that the gettering site is not efficiently formed on account of insufficient oxidation of implantated phosphorus.

OBJECT AND SUMMARY OF THE INVENTION

The object of the present invention is to overcome the foregoing problems and provide a method of preparing an alkali metal diffusion-preventive layer capable of manufacturing an alkali metal diffusion-preventive layer having higher performance of preventing alkali metal diffusion than that of alkali metal diffusion preventive layer, manufactured in the conventional method.

In accordance with the present invention, one of the following means (a)–(c) is adopted in a method of implantation of phosphorus into a substrate containing silcon thereby forming an alkali metal diffusion-preventive layer containing phosphorus at the inside of the substrate:

(a) Ion implantation of phosphorus and ion implantation of oxygen are applied simultaneously or alternately and, subsequently, heat treatment is applied to the substrate.

(b) Ion implantation of phosphorus is applied and, subsequently, ion implantation of oxYgen is applied while heating the substrate.

(c) Ion implantation of phosphorus is applied and, subsequently, heat treatment is applied to the substrate in an atmosphere containing an oxygen gas.

DETAILED DESCRIPTION OF A PREFERRED EMBODIMENT

The heat treatment (a) described above is applied for combining phosphorus and oxygen implanted to the inside of the substrate with silicon in the substrate to each other, thereby stabilizing the glass structure, which is preferably applied at a temperature higher than 400° C. If the temperature is lower than 400° C., less stabilization occurs and, accordingly, the effect of the present invention is less developed. On the other hand, if the temperature is higher than the distortion point of glass, it tends to cause deformation of the substrate, diffusion of the phosphor silicate glass layer, etc. The heat treatment after the ion implantation of oxygen may be conducted in an oxygen gas-containing atmosphere or in an inert gas atmosphere. In particular, if the substrate is made of such material as Si that denatures by the heat treatment in the oxygen gas atmosphere, use of the inert gas atmosphere is desirable since the surface oxidation can be prevented. Phosphorus and oxygen may be implanted repeatedly.

Heating of the substrate upon ion implantation of oxygen in (b) above is a procedure required for stabilizing to attain the glass structure in the same meanings as the heat treatment described above and, preferably, conducted at a temperature higher than 400° C. If the temperature is lower than 400° C., the effect of the present invention is less developed as described above. Further, if the temperature is higher than the distortion point of glass, it tends to cause remarkable deformation of the substrate or diffusion of phosphorus in the implanted state.

In the means (a) and (b), the acceleration energy and the amount or phosphorus and oxygen can properly be controlled as necessary depending on the material of the substrate, the amount of alkali metal impurity in the substrate, required alkali metal diffusion preventive performance, etc., and it is usually preferred to set the acceleration energy to 1 KeV–5 MeV and the dose to $1 \times 10^{12}$ to $1 \times 10^{18}/cm^2$. Further, it is preferred for the implantation of phosphorus and oxygen ions such that are dispersed substantially in the same depth at the inside of the substrate.

The heat treatment in the oxygen atmosphere in (c) above is applied for diffusing oxygen in the atmosphere from the surface to the inside of the substrate and combining with phosphorus present at the inside of the substrate by the ion implantation, and the temperature, time, etc. for the heat treatment are controlled depending on the acceleration energy or dose of phosphorus, material for the substrate and oxygen concentration in the atmospheric gas, etc. Higher oxygen concentration in the atmosphere is preferred since the processing time can be shortened. Further, it is preferred to increase the heat processing temperature as high as possible within a range of restriction caused by the material for the substrate (melting point, softening point, etc.) since the processing time can be shortened with higher processing temperature.

A required time t for the heat processing can be roughly determined as: $t \geq L^2/D_{ox}$ in which L represents the maximum injection depth (m) of phosphorus and $D_{ox}(m^2/s)$ represents the diffusion coefficient of oxygen at the heat treating temperature.

The substrates usable herein are those containing Si, at the surface, silicon, siicon nitride, quartz, quartz glass, non-alkali glass and alkali-containing glass. In particular, alkali-containing glass such as soda lime glass, low alkali content glass such as borosilicate glass are preferred since they show good productivity and preferred durability.

The present invention is based on the knowledge that the gettering effect of the alkali metal in the conventional phosphor silicate glass layer formed at the inside of the substrate by the ion implantation of phosphorus can not be attained as expected, because oxygen in the phosphor silicate glass layer is insufficient to provide a stable state and "negatively polarized non-bridging oxygen" for capturing alkali metal is less formed. According to the present invention, oxygen is supplied into the phosphor silicate glass by ion implantation of oxYgen or diffusion of oxygen, by which negatively polarized non-bridging oxygen due to the presence of phosphor is formed enough to provide a sufficient gettering effect of the alkali metal.

In particular, by the method of supplying oxygen by the ion implantation of oxygen, oxygen can be supplied in a required amount only at a required depth.

Further, by the ion implantation of oxYgen, since alkali metal present from the outermost surface of the substrate to the phosphor silicate glass layer is moved along the direction of depth by the ion implantation and the alkali metal content in that portion can be reduced, the alkali metal diffusion-preventive performance can further be improved.

EXAMPLES AND COMPARATIVE EXAMPLES

Alkali-alumina-silicate glass containing 0.1 to 3 atom % of alkali metal was used as a substrate.

At first, phosphorus was ion implanted by $1\times 10^{17}/cm^2$ and at an acceleration energy at 140 KeV. The specimen is herein referred to as A. The specimen A was applied with heat treatment in a nitrogen atmosphere at 600° C. for one hour to prepare a specimen B. Further, oxygen was ion implanted by $2.5\times 10^{17}/cm^2$ under an acceleration energy at 70 KeV to the specimen A. The heat treatment was applied at a temperature of 600° C. for one hour. There was no particular restriction for the atmosphere. The specimen is referred to as the specimen C.

Further, the specimen A was applied with heat treatment at 600° C. for one hour in an oxygen atmosphere to prepare a specimen D (although there was no data for the diffusion coefficient of oxygen at 600° C. in this glass composition, $\sqrt{D_{ox}}\sim 6$ $\mu m/h^{178}$ for the silica glass is referred to). The diffusion length of oxygen is up to 6 $\mu m$, which is sufficiently longer than the average projection flying distance 143 nm of P implanted at an acceleration energy of 140 KeV. When the specimens B, C and D were measured by SIMS, the Na concentration near the surface was increased in the order of: C D B and the surface Na concentration to the bulk Na concentration was restricted to about 1/10,000 for C, about 1/5,000 for D and about 1/1,000,000 for B. A polycrystalline silicon thin film transistor (hereinafter simply referred to as TFT) was formed to each of the substrates B, C and D and a threshold voltage for turning TFT to ON and aging stability was evaluated. As a result, there was recognized no difference for the characteristics of the TFT formed on the substrates C, D to those prepared on quartz glass. However, for the TFT formed on the substrate B, the threshold voltage was increased by up to 50% than that formed on the quartz glass substrate and the drain current after 1000 sec was reduced by 20% than that of the TFT formed on a quartz glass substrate.

According to the present invention, as apparent from examples, it is possible to prepare an alkali metal diffusion-preventive layer of higher performance for preventing alkali metal diffusion than that of the alkali metal diffusion preventive layer prepared by the conventional method.

The present invention is useful, for example, as a method of modifying inexpensive alkali-containing glass substrates into a substrate for electronic devices, or a method of preventing undesired effects of alkali metals as much as possible in a substrate for electronic devices made of metal containing a trace amount of alkali metal as impurity.

Having described a specific preferred embodiment of the present invention, it is to be understood that the invention is not limited to that precise embodiment, and that various changes and modifications may be effected therein by one skilled in the art without departing from the scope or spirit of the invention as defined in the appended claims.

What is claimed is:

1. A method of preparing an alkali metal diffusion preventive layer of forming an alkali metal diffusion preventive layer containing phosphorus at the inside of a substrate containing silica by ion implantation of phosphorus, wherein one of the following means (a) to (c) is applied:
    (a) the phosphorus ion implantation and oxYgen ion implantation are applied simultaneously or alternately and, subsequently, heat treatment is applied to the substrate,
    (b) ion implantation of phosphorus is applied and, subsequently ion implantation of oxygen is applied while heating the substrate, and
    (c) ion implantation of phosphorus was applied and subsequently, heat treatment is applied to the substrate in an atmosphere containing an oxygen gas.

2. A preparing method as defined in claim 1, wherein the temperature for heat treatment is higher than 400° C.

3. A preparing method as defined in claim 1, wherein the substrate comprises at least one of materials selected from the group consisting of soda lime glass and boron silicate glass.

4. A preparing method as defined in claim 1, wherein the ion implantation of phosphorus and oxygen is applied such that they are dispersed at the inside of the substrate substantially the same depth.

* * * * *